(12) United States Patent
Neuhaus et al.

(10) Patent No.: US 12,465,143 B2
(45) Date of Patent: Nov. 11, 2025

(54) CARRIAGE FOR A LINEAR GUIDE SYSTEM AND LINEAR GUIDE SYSTEM COMPRISING SUCH A CARRIAGE

(71) Applicant: Accuride International GmbH, Diez (DE)

(72) Inventors: Christoph Neuhaus, Niederelbert (DE); Patrick Neidhöfer, Seelbach (DE); Thomas Quirein, Diez (DE)

(73) Assignee: Accuride International GmbH, Diez (DE)

( * ) Notice: Subject to any disclaimer, the term of this patent is extended or adjusted under 35 U.S.C. 154(b) by 173 days.

(21) Appl. No.: 18/229,822

(22) Filed: Aug. 3, 2023

(65) Prior Publication Data

US 2024/0052884 A1 Feb. 15, 2024

(30) Foreign Application Priority Data

Aug. 9, 2022 (DE) .................... 10 2022 120 080.9

(51) Int. Cl.
*F16C 29/04* (2006.01)
*A47B 88/473* (2017.01)
(Continued)

(52) U.S. Cl.
CPC .......... *A47B 88/473* (2017.01); *A47B 88/487* (2017.01); *F16C 29/02* (2013.01);
(Continued)

(58) Field of Classification Search
CPC ... A47B 88/473; A47B 88/483; A47B 88/487; A47B 88/493; A47B 2210/0035;
(Continued)

(56) References Cited

U.S. PATENT DOCUMENTS 2,250,895 A * 7/1941 Premo .................... A47B 88/57
312/334.11
2,267,043 A * 12/1941 Premo .................. A47B 88/447
312/331

(Continued)

FOREIGN PATENT DOCUMENTS

DE 202015105035 U1 10/2015
DE 102014220049 A1 4/2016

(Continued)

OTHER PUBLICATIONS

German Search Report received for DE Application No. 102022120080. 9, mailed on May 15, 2023, 4 pages original document only.

(Continued)

*Primary Examiner* — Kimberley S Wright
(74) *Attorney, Agent, or Firm* — MEDLER FERRO WOODHOUSE & MILLS PLLC (57) ABSTRACT

A carriage for a linear guide system. The linear guide system includes a rail member including two running surfaces facing each other, and the carriage movable relative to the rail member in and against a pull-out direction. The carriage has a base body, a first pair of support elements and a second pair of support elements in the form of sliders and at least one first support spring element and at least one second support spring element. The second pair support elements is arranged spaced apart from the first pair of support element in the pull-out direction. Thereby, each of the sliders of the first pair of support elements and each of the support elements of the second pair of support elements is movably mounted on the base body in an upward direction perpendicular to the pull-out direction, such that each of the sliders is frictionally engageable with a respective one of the running surfaces. The at least one first support spring element is mounted on the base body such that the at least one first support spring element biases the sliders of the first (Continued)

pair of support elements away from each other in the upward direction. The at least one second support spring element is mounted on the base body such that the at least one second support spring element biases the support elements of the second pair of support elements away from each other in the upward direction.

17 Claims, 8 Drawing Sheets

(51) Int. Cl.
    *A47B 88/483*     (2017.01)
    *A47B 88/487*     (2017.01)
    *F16C 29/02*     (2006.01)
    *F16C 29/00*     (2006.01)
    *F16C 29/12*     (2006.01)

(52) U.S. Cl.
    CPC ...... *F16C 29/04* (2013.01); *A47B 2210/0032* (2013.01); *A47B 2210/0035* (2013.01); *F16C 29/002* (2013.01); *F16C 29/007* (2013.01); *F16C 29/123* (2013.01)

(58) Field of Classification Search
    CPC ......... A47B 2210/0032; A47B 88/4987; F16C 29/007; F16C 29/02; F16C 29/123; F16C 29/126; F16C 29/04; F16C 29/045
    See application file for complete search history.

(56) References Cited

U.S. PATENT DOCUMENTS

| | | | | |
|---|---|---|---|---|
| 3,801,166 | A * | 4/1974 | York | A47B 88/407 312/334.44 |
| 8,876,230 | B2 * | 11/2014 | Lowe | A47B 88/49 312/319.1 |
| 11,415,172 | B2 * | 8/2022 | Neuhaus | F16C 29/048 |
| 2006/0043851 | A1 * | 3/2006 | Lee | A47B 88/467 312/333 |
| 2011/0081104 | A1 * | 4/2011 | Chiang | A47B 88/487 384/19 |
| 2012/0020593 | A1 * | 1/2012 | Rehage | A47B 88/57 384/54 |
| 2014/0318422 | A1 * | 10/2014 | Neuhaus | F16M 11/043 108/44 |
| 2017/0175811 | A1 | 6/2017 | Zimmermann | |
| 2018/0372154 | A1 * | 12/2018 | Moshammer | F16C 29/02 |
| 2020/0370596 | A1 * | 11/2020 | Neuhaus | F16C 33/3806 |

FOREIGN PATENT DOCUMENTS

| | | | |
|---|---|---|---|
| JP | 2003314545 A | * | 11/2003 |
| KR | 10-2024135 B1 | | 9/2019 |
| WO | 2021/209301 A1 | | 10/2021 |

OTHER PUBLICATIONS

European Search Report for EP Patent Application No. 23187524.6, Issued on Dec. 21, 2023, 1 page.

* cited by examiner

CARRIAGE FOR A LINEAR GUIDE SYSTEM AND LINEAR GUIDE SYSTEM COMPRISING SUCH A CARRIAGE

The application claims priority of German patent application no. 10 2022 120 080.9, filed on Aug. 9, 2022, which is incorporated by reference herein in its entirety.

The present invention relates to a carriage for a linear guide system, wherein the linear guide system comprises a rail element having two running surfaces facing each other and the carriage movable relative to the rail element in and against a pull-out direction, the carriage having a base body, a first pair of support elements in the form of sliders and at least one first support spring element, wherein each of the sliders of the first pair of support elements is movably supported on the base body in an upward direction perpendicular to the pull-out direction such that each of the sliders is frictionally engageable with a respective one of the running surfaces, and wherein the at least one first support spring element is supported on the base body such that the at least one first support spring element biases the sliders of the first pair of support elements away from each other in the upward direction.

The present invention further relates to a linear guide system comprising such a carriage and a rail element, wherein the rail element has two running surfaces facing each other, wherein the carriage and the rail element are linearly displaceable relative to each other in and against the pull-out direction, wherein each of the sliders of the first pair of support elements is frictionally engaged with a respective one of the running surfaces.

Linear guide systems with a carriage and a rail element, wherein rolling elements fixed to the carriage are provided between the carriage and the running surfaces of the rail element, are known from the prior art. They are used in various household appliances, but also in automotive engineering and many other applications. In order to enable the carriage to be displaced with as little friction as possible relative to the rail element, rolling elements are arranged between the rail element and the carriage, wherein the rolling elements roll on the surface of the running surfaces of the rail element or execute a sliding movement relative to the surface of the running surfaces during a relative movement of the carriage and the rail element. The resulting rolling and/or sliding friction is less than a direct sliding friction between the carriage and the rail element. However, in such a design of a linear guide system, it is difficult to precisely adjust the force necessary to move the carriage relative to the rail element. Moreover, the position of the carriage relative to the rail element cannot be precisely defined by the rolling elements.

Therefore, a modified carriage for a linear guide system of the kind mentioned at the beginning as well as a linear guide system with such a carriage and a rail element are known from WO 2021/209301 A1.

In contrast, the present invention is based on the task of providing a carriage for a linear guide system which has a reduced clearance relative to the rail element.

To solve this problem, a carriage for a linear guide system according to independent claim 1 of the present application is proposed. For this purpose, the carriage for a linear guide system of the type mentioned above additionally comprises a second pair of support elements and at least one second support spring element, wherein the second pair of support elements is arranged spaced apart from the first pair of support elements in the pull-out direction, wherein each of the support elements from the second pair of support elements is movably mounted on the base body in the upward direction, so that each of the support elements is engageable with a respective one of the running surfaces, and wherein the at least one second support spring element is supported on the base body such that the at least one second support spring element biases the support elements of the second pair of support elements away from each other in the upward direction.

In the first instance, the present invention relates to such a carriage for a linear guide system independently of the rail element required for the linear guide system.

It has been found that linear guide systems with carriages having only a single, first pair of support elements biased towards the running surfaces of the rail element and, for example, a plurality of rolling elements rotatably mounted with respect to the base body and rolling on the running surfaces of the rail element, have a comparatively large upward clearance with respect to the rail element. For the purposes of the present invention, upward clearance is understood to be a clearance of the base body relative to the rail element in an upward direction of the rail element, i.e. perpendicular to the pull-out direction and substantially parallel to the rail back of the rail element. An upward clearance leads to a movement of the carriage in relation to the rail element when corresponding forces or moments are introduced. Such an upward clearance has acoustic and haptic disadvantages for the user of such a linear guiding system.

The second pair of support elements on the carriage according to the invention serves to compensate for play along the upward direction and, if necessary, as a torque support to absorb torques acting on the carriage and rotating it about an axis of rotation perpendicular to the rail back.

Sliders, which form the support elements of the first pair of support elements and, if applicable, at least the support elements of the second pair of support elements or the support elements of the third pair of support elements, are components which, due to their geometric design and/or their mounting or fixing to the base body, can only slide on the running surfaces but cannot roll. An example of such a slider is a component with a cylindrical surface, wherein the cylinder axis is aligned substantially in the pull-out direction of the carriage. It is understood that such a component can slide on the respective running surface, but cannot roll thereon.

In an embodiment of the invention, at least the two sliders of the first pair of support elements and the first support spring element or the two support elements of the second pair of support elements and the second support spring element or the two support elements of the third pair of support elements and the third support spring element each form a functional unit, since exactly one first support spring element resp. exactly one second support spring element or exactly one third support spring element biases the two sliders or support elements of a pair away from each other and thus towards the running surfaces of the rail element. In this way, a defined frictional force is provided between the carriage, namely the support elements provided on the carriage, and the rail element. Furthermore, in such an embodiment, the two support elements of the respective pair of support elements position the carriage.

In an alternative embodiment of the invention, at least the two sliders of the first pair of support elements or the support elements of the second pair of support elements or the support elements of the third pair of support elements are each biased towards the respective running surface with their own first support spring element or second support spring element or third support spring element, respectively. In such an embodiment, the carriage has at least two first support spring elements or two second support spring elements or two third support spring elements supported on the carriage or on each other.

In an embodiment of the invention, the exactly one first support spring element and the two sliders of the first pair of support elements are floatingly mounted on the base body in the upward direction. This means that the exactly one first support spring element is supported in the upward direction exclusively on the two sliders, but not on the base body of the carriage. In this way, the spring force exerted on the two sliders is independent of the exact position of the base body in the upward direction. In particular, in an embodiment, the spring force exerted on the two sliders is equal. It is understood that such a floating support may also be provided for exactly one second support spring element and the support elements of the second pair of support elements, as well as for exactly one second support spring element and the support elements of the second pair of support elements.

In an embodiment of the invention, at least the spring force exerted by the at least one first support spring element on the sliders or the spring force exerted by the at least one second support spring element on the support elements of the second pair of support elements or the spring force exerted by the at least one third support spring element on the support elements of the third pair of support elements is adjustably variable. Such adjustability of the spring force can be realised both in the case of a fixed mounting of the respective support spring element on the base body and in the case of a floating mounting of the respective support spring element relative to the base body. Adjustability of the support spring element means that the spring force can be varied and adjusted either before the carriage is mounted or when the carriage is already mounted in the rail element. In an embodiment of the invention, the adjustability of the spring force is realised by the fact that for a given distance between the two running surfaces of the rail element, the distance between the abutments for the support spring element on the two support elements is adjustable. In this way, the installation space available for the support spring element between the two support elements in the upward direction can be adjusted and the spring preload of the support elements can be varied.

In an embodiment of the invention, at least the at least one first support spring element or the at least one second support spring element or the at least one third support spring element is a spiral spring. Spiral springs can be manufactured simply and inexpensively and can be installed with a defined spring force. In an embodiment of the invention, a single spiral spring supports both support elements of the first pair of support elements and pushes them away from each other towards the running surfaces of the rail element. Furthermore, in an embodiment of the invention, the respective support spring element does not introduce forces into the base body of the carriage in the upward direction.

In an embodiment of the invention, the two sliders of a pair of support elements are made of plastic, preferably by injection moulding.

In an embodiment of the invention, the slider has a T-shaped section, wherein the transverse bar of the T-shape forms that part of the slider which comes into sliding engagement with the respective running surface of the rail element. The vertical beam, on the other hand, serves to accommodate the support spring element. In an embodiment, if the support spring element is a coil spring, the vertical bar extends into the interior of the coil spring.

In an embodiment, the slider has at least one, but in particular exactly two guide pins. One such guide pin engages in a respective guide bush in the base body of the carriage, so that the slider is guided in the pull-out direction, while it is floating in the upward direction.

In an embodiment of the invention, the guide pin is cylindrical and has a circular cross-section. In an embodiment, the guide bush is complementary to the guide pin as a hollow cylinder.

There are a variety of embodiments for implementing the second pair of support elements.

In an embodiment, in addition to the first and second pairs of support elements, the carriage also comprises a third pair of support elements and at least one third support spring element. Each of the support elements of the third pair of support elements is movably mounted to the base body in the upward direction so that each of the support elements is engageable with a respective one of the running surfaces. The at least one third support spring element is mounted on the base body such that the at least one third support spring element biases the support elements of the third pair of support elements away from each other in the upward direction. Thereby, the support elements of the second pair of support elements are arranged in front of the sliders of the first pair of support elements in the pull-out direction and the support elements of the third pair of support elements are arranged behind the sliders of the first pair of support elements in the pull-out direction.

In an embodiment of the invention, the support elements of the second pair of support elements and the third pair of support elements are rolling elements, in particular balls. In other words, in such an embodiment, an arrangement comprising a first pair of support elements in the form of sliders is combined with two pairs of rolling elements biased onto the running surfaces of the rail element. A rolling element can perform a sliding or a rolling movement or a combined sliding/rolling movement relative to the running surface of the rail element, depending on the friction between the rolling element and the respective running surface of the rail element.

In an embodiment of the invention, the rolling elements of the second and third pairs of support elements are received on the base body in such a way that the rolling elements can roll at least on the two running surfaces or perform a sliding movement relative to the two running surfaces.

A rolling element within the meaning of the present application is understood to be a rotating element which, as an element of a guide, considerably reduces the friction between the carriage and the rail element and thus facilitates a relative movement of the carriage with respect to the rail element. Rolling elements are, for example, balls, rollers, barrels, needles or cones.

In an alternative embodiment of the invention, at least the support elements of the second pair of support elements or the third pair of support elements are each sliders. Thereby, in an embodiment of the invention, the sliders of each pair of support elements have an extension in the pull-out direction, wherein the extension in the pull-out direction of each slider of the second pair and the third pair of support elements is smaller than the extension in the pull-out direction of each slider of the first pair of support elements. Such an embodiment is very close to an embodiment of the second and/or third pair of support elements as rolling elements, wherein a rolling movement of the sliders on the running surfaces of the rail element is excluded.

In an embodiment of the invention, the base body determines a position of each support element of the second and/or third pair of support elements in the pull-out direction relative to the base body.

In an embodiment of the invention, the support elements of the second and third pairs of support elements are equidistant in the pull-out direction from the sliders of the first pair of support elements.

In an embodiment of the invention, a stop is provided on the base body for each of the support elements of the second pair of support elements and the third pair of support elements, the stop limiting a spring travel of the support elements in a direction perpendicular to the pull-out direction and against a spring force of the second and third support spring elements. By limiting the spring travel of the support elements of the second pair and the third pair of support elements, increased stability of the carriage against pitching relative to the rail element is achieved. At the same time, play is still taken up and damped by the spring force of the support spring elements.

In an embodiment of the invention, the carriage comprises exactly a first, a second and a third pair of support elements.

In an embodiment of the invention, the support elements of the second pair of support elements are sliders in the same way as the support elements of the first pair of support elements.

It is understood that in such an embodiment, the sliders of the second pair of support elements have an identical embodiment as the sliders of the first pair of support elements, or else a shape different from the embodiment of the slider of the first pair of support elements. An embodiment of the invention in which the support elements of the first pair and the support elements of the second pair of support elements are substantially identical sliders is also referred to as tandem shoring.

In an embodiment of the invention, the carriage thereby comprises only the first pair of resiliently biased support elements in the form of sliders and the second pair of resiliently biased support elements in the form of sliders and no other resiliently biased support elements.

In one embodiment of the invention, wherein the carriage comprises a first pair of support elements in the form of sliders and a second pair of support elements in the form of sliders, the carriage in a further embodiment additionally comprises a plurality of rolling elements, wherein the plurality of rolling elements are received on the base body in such a manner, that the plurality of rolling elements are rollable at least on the two running surfaces or perform a sliding movement relative to the two running surfaces, and that the plurality of rolling elements is spaced apart from the first and the second pair of support elements in the pull-out direction, and wherein the base body determines a position of each of the plurality of rolling elements in a pull-out direction relative to the base body. Thereby, in an embodiment, the rolling elements are not resiliently biased away from or towards the running surfaces of the rail element.

In an embodiment of the invention, the sliders of the first pair of support elements and the second pair of support elements in contact with a running surface are arranged in the pull-out direction, preferably symmetrically, between two rolling elements. If rolling bodies are provided in front of and behind the sliders in the pull-out direction, the sliders also fulfil a position-stabilising function with regard to the positioning of the base body of the carriage relative to the rail element.

In an embodiment of the invention, the carriage comprises exactly four rolling elements, wherein the two sliders of the first and the second pair of support elements engaged with exactly one of the running surfaces of the rail element are arranged between two rolling elements engaged with the same running surface.

In an embodiment, the two sliders of the first and second pair of support elements engaged with exactly one of the running surfaces of the rail element are symmetrically arranged between at least two rolling elements engaged with the same running surface.

In an embodiment of the invention, a detent body and a detent spring are additionally provided on the carriage, wherein the detent spring biases the detent body in a direction perpendicular to the pull-out direction and in the upward direction or perpendicular to the upward direction. Such detent body engages with a detent recess or a detent ramp formed on the rail element and enables discrete positioning or detenting of the carriage relative to the rail element.

In an embodiment of the invention, the detent body is a detent ball. In an embodiment of the invention, such a detent ball has a smaller diameter than the rolling elements or balls that form the support elements of the second and third pairs of support elements in an embodiment of the invention. In another embodiment, the detent spring is a coil spring.

In an embodiment of the invention, the detent spring is supported on a slider of the first pair of support elements. Such an embodiment is particularly useful if the sliders of the first pair of support elements are arranged symmetrically with respect to the pull-out direction on the carriage, i.e. in the centre of the carriage. Then the detent body can also be arranged in the middle of the rail element at the same time once it is only supported on the slider. Furthermore, the integration of the detent body and the detent spring into the slider allows for a reduced effort in system integration, i.e. the assembly of the individual elements on the carriage. It is understood that in such an embodiment the detent body is guided in a recess in the respective slider.

In an embodiment of the invention, the detent spring and the first support spring element are configured as spiral springs, wherein the detent spring and the first support spring element are arranged coaxially with respect to each other, i.e. their centre axes coincide.

While the implementation of a detent function was previously considered as an option for the carriage according to the invention with a second pair of support elements, a carriage comprising a pair of support elements in the form of sliders and a detent body and a detent spring, as described in detail below, also forms an independent invention without the carriage being configured with a further pair of support elements.

From a further aspect, the present application therefore also relates to a carriage for a linear guide system comprising a rail element having two running surfaces facing each other and the carriage being movable relative to the rail element in and against a pull-out direction, wherein the carriage comprises a base body, exactly one pair of support elements, wherein the pair of support elements are in the form of sliders, and at least one support spring element, wherein each of the sliders of the pair of support elements is movably supported on the base body in an upward direction perpendicular to the pull-out direction such that each of the sliders is frictionally engageable with a respective one of the running surfaces, and wherein the at least one support spring element is mounted on the base body such that the at least one support spring element biases the sliders of the pair of support elements away from each other in the pull-out direction, wherein a detent body and a detent spring are additionally provided on the carriage, wherein the detent spring biases the detent body in a direction perpendicular to the pull-out direction and in the upward direction or perpendicular to the upward direction. Such detent body engages with a detent recess or a detent ramp formed on the rail element and enables discrete positioning or detenting of the carriage relative to the rail element.

In an embodiment of the invention, the detent body is a detent ball. In an embodiment of the invention, such a detent ball has a smaller diameter than the rolling elements or balls that are arranged on the base body in addition to the sliders and roll on the running surfaces of the rail element without being resiliently biased towards the running surfaces. In a further embodiment, the detent spring is a coil spring.

In an embodiment of the present second invention, the detent spring is supported on a slider of the pair of support elements. Such an embodiment is particularly useful when the sliders of the pair of support elements are arranged symmetrically with respect to the pull-out direction on the carriage, i.e. in the centre of the carriage. Then the detent body can also be arranged in the middle of the rail element at the same time once it is only supported on the slider. Furthermore, the integration of the detent body and the detent spring into the slider also leads to a reduced effort in system integration, i.e. the assembly of the individual elements on the carriage. It is understood that in such an embodiment the detent body is guided in a recess in the respective slider.

In an embodiment of the second invention, the detent spring and the support spring element are configured as spiral springs, wherein the detent spring and the support spring element are arranged coaxially with respect to each other, i.e. their centre axes coincide.

In an embodiment of the invention, the base body of the carriage is made of metal or of plastic. In particular, an embodiment of the base body made of plastic makes it possible to manufacture the base body in large quantities at low cost, preferably in one piece (one-piece), for example by injection moulding. In addition, plastic enables a reduction in weight.

A mobile component, such as a drawer in a motor vehicle, is mounted on the base body of the carriage when the linear guide system is installed. For this purpose, in an embodiment the base body has at least one threaded hole or a hole in which a fastening means, for example a screw, engages for fastening the mobile component.

In an embodiment which has support elements in the form of rolling elements or also additional, non-resiliently pre-stressed rolling elements, the base body of the carriage also serves as a rolling element cage for the rolling elements, which determines the positions of the rolling elements in the pull-out direction relative to the base body.

For the purposes of the present application, the pull-out direction means the direction in and against which the carriage is linearly displaceable relative to the rail element when installed.

For the purposes of the present application, the upward direction is understood to be a direction perpendicular to the pull-out direction and extending substantially parallel to a rail back of the rail element. In other words, the upward direction is parallel to the spring force exerted by the at least one first support spring element on the slider.

The above object is also solved by a linear guide system comprising a rail element with two running surfaces facing each other and a carriage according to one of the embodiments as previously described, wherein the carriage and the rail element are linearly displaceable relative to each other in and against the pull-out direction, and wherein each of the sliders of the first pair of support elements is frictionally engaged with a respective one of the running surfaces, and wherein each of the support elements of the second pair of support elements is engaged with a respective one of the running surfaces.

In an embodiment of the invention, the linear guide system is selected from a group consisting of an extension guide, a telescopic rail and a linear guide. In this context, the generic term linear guide system includes a sliding guide, a ball guide and a roller guide. When the present application refers to a linear guide system, this term is to be understood in such a general way that it includes not only linear guides in which the carriage is significantly shorter than the rail element and the carriage can only be moved within the length of the rail element, but also linear guides in which the base body of the carriage is so long that it protrudes over the length of the rail element when at least one end position is reached, thus forming a partial extension.

In turn, in an embodiment, the linear guide system according to the invention is itself a component of a more complex linear guide. In one embodiment, the carriage of the linear guide system is connected to a further first rail element of a telescopic rail, so that the carriage cannot perform any relative movement with respect to the further first rail element. In such an embodiment, the telescopic rail also comprises a further second rail element which is slidably mounted on the further first rail element relative to the further first rail element.

In an embodiment of the invention, the rail element is made at least in sections of metal, in particular of steel or aluminium, or of plastic.

In an embodiment of the invention, wherein the carriage comprises a detent body and a detent spring in addition to the sliders and support elements or to the sliders alone, the rail element comprises a detent recess, preferably in one of the two running surfaces, wherein the detent recess is arranged such that the detent body or a rolling element of at least the second or the third pair of support elements is detentable in the detent recess.

Further advantages, features and possible applications of the present invention will become apparent with reference to the following description of embodiments and the accompanying figures. In the figures, equal elements are denoted by identical reference signs.

The carriages 1 shown in the figures serve to implement a linear movement along a linear or straight path in a rail element 30. The respective carriage 1 together with the rail element 30 forms a linear guide system in the form of a linear guide 31.

Such a rail element 30 of a linear guide 31 generally comprises a rail back 32 connecting two legs 33, wherein the legs 33 support the running surfaces 34 of the rail element 30. For this purpose, the legs 33 of the rail element 30 are curved in the shape of a part of a circle, so that an approximately C-shaped profile is formed overall. The carriage 1 is received within the C-shaped profile, wherein the carriage 1 is supported there by the support elements described in more detail below and is thus guided by the running surfaces 34 of the rail element 30.

Each carriage 1 has a base body 2 which serves as a support for a mobile component which is attached to the base body 2. Such a mobile component is, for example, a drawer which is to undergo a linear extension movement relative to a stationary component connected to the rail element. For this purpose, the base body 2 of the carriage has fastening means, in the embodiments shown internal threads 4, which can be connected with screws.

The base bodies 2 of the carriages 1 each have convexly curved guide surfaces 3. These guide surfaces 3 are essentially complementary to the running surfaces of the respective rail element and therefore point away from each other on the two side surfaces of the respective carriage 1. However, the guide surfaces 3 of the base body 2 only serve as emergency running surfaces in the event that the other elements provided for guiding the respective carriage on the base body 2 are loaded beyond an intended extent. Therefore, when the carriage is installed, the guide surfaces 3 of the carriage 2 have a clearance with respect to the running surfaces 34 of the respective rail element 30.

The actual guidance of the carriage 1 is provided by a plurality of support elements which are resiliently biased towards the running surfaces 34 of the respective rail element 30. These support elements are always arranged in pairs such that a first support element of a pair faces and is biased towards a first running surface 34 of the rail element 30 and a second support element of the same pair is biased towards the second running surface 34 of the same rail element 30. In other words, the support elements of each pair of support elements are biased away from each other in the upward direction 12 of the linear guide.

The first embodiment of the carriage 1 according to the embodiments of FIGS. 1 to 4 comprises three pairs 5, 6, 7 of support elements. The first pair of support elements 5 is formed by two sliders 8. These sliders 8 have substantially partially cylindrical sliding surfaces 9 which are in frictional engagement with the running surfaces 34 of the respective rail element 30. The sliders 8 can perform exclusively a sliding movement along the running surfaces 34 of the rail element 30 both due to the geometric design of their sliding surfaces 9 (these have a shape complementary to the running surfaces of the rail element) and due to their mounting or fixing to the base body 2. A rolling movement or a combined rolling/sliding movement is excluded.

The carriages 1 are provided for linear movement in and against a pull-out direction 10 on the respective rail element. The direction perpendicular to the pull-out direction 10 and substantially parallel to the rail back 32 of the rail element 30 or parallel to the surface 11 of the base body 2 shown in the figures is referred to as the upward direction 12 of the carriage 1 or the rail element 30 or the linear guide 31 as a whole.

Figure 1:
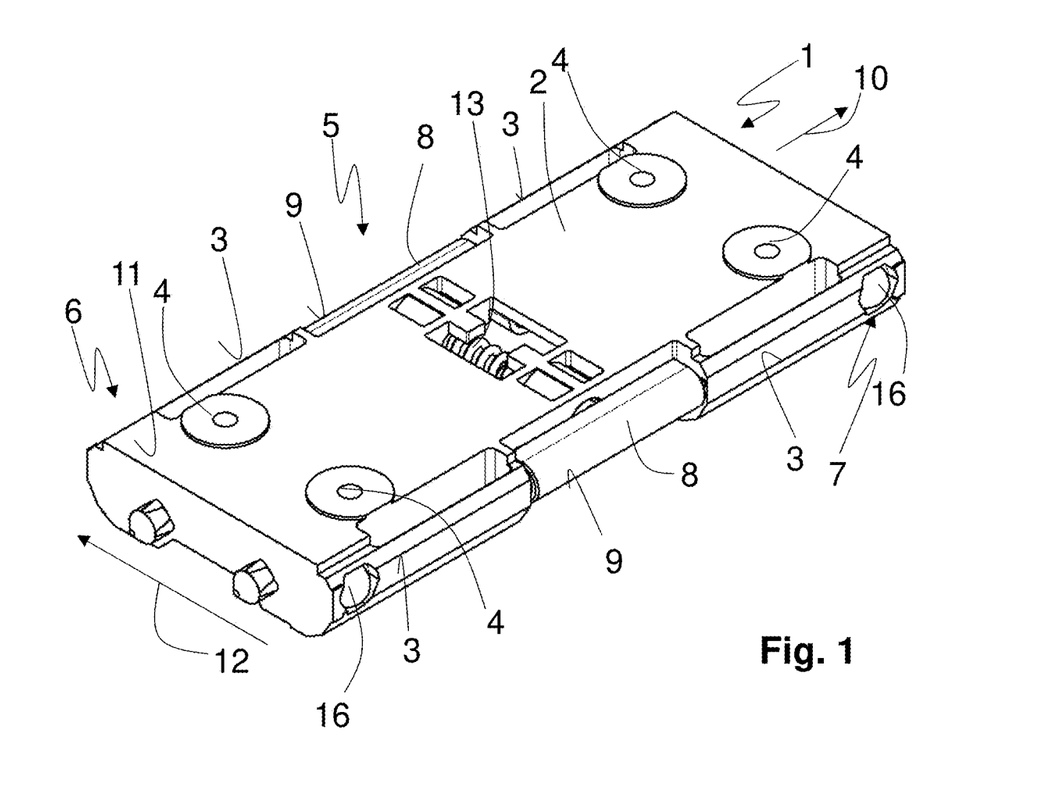
FIG. 1 is an isometric representation of a first embodiment of a carriage according to the invention.
Figure 2:
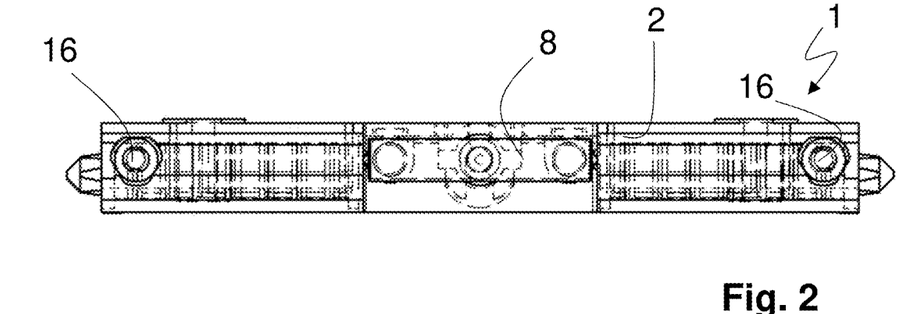
FIG. 2 is a partially transparent side view of the carriage of FIG. 1.
Figure 3:
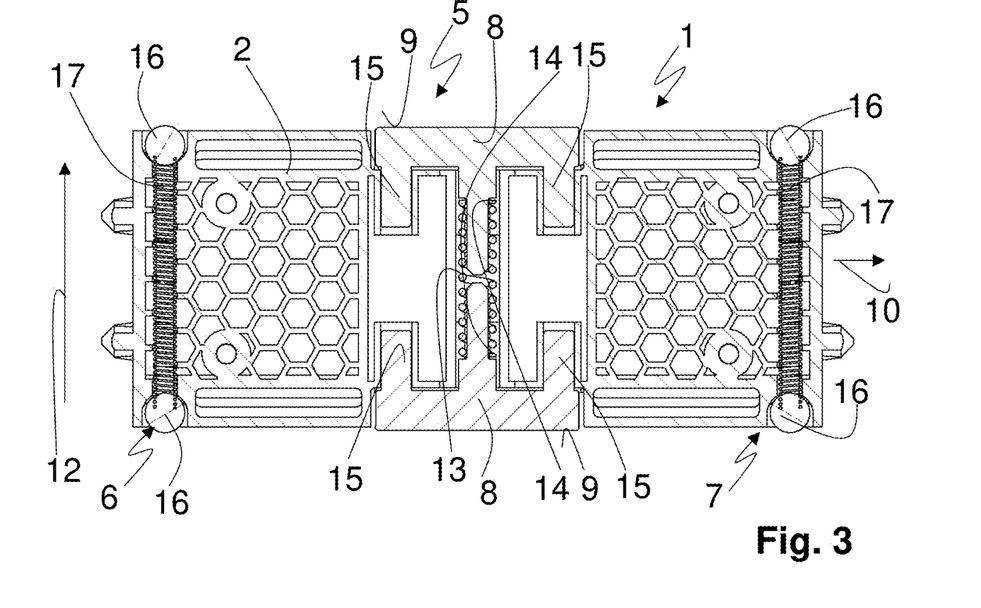
FIG. 3 is a cross-sectional view of the carriage of FIGS. 1 and 2.
Figure 4:
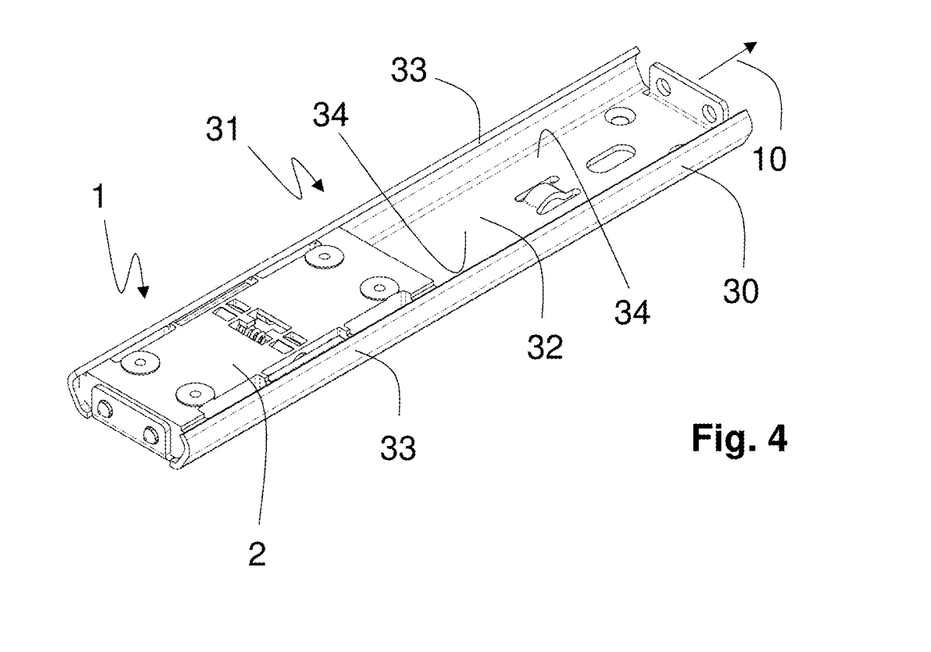
FIG. 4 is an isometric view of a linear guide comprising the carriage of FIGS. 1 to 3 and a rail element.
Figure 5:
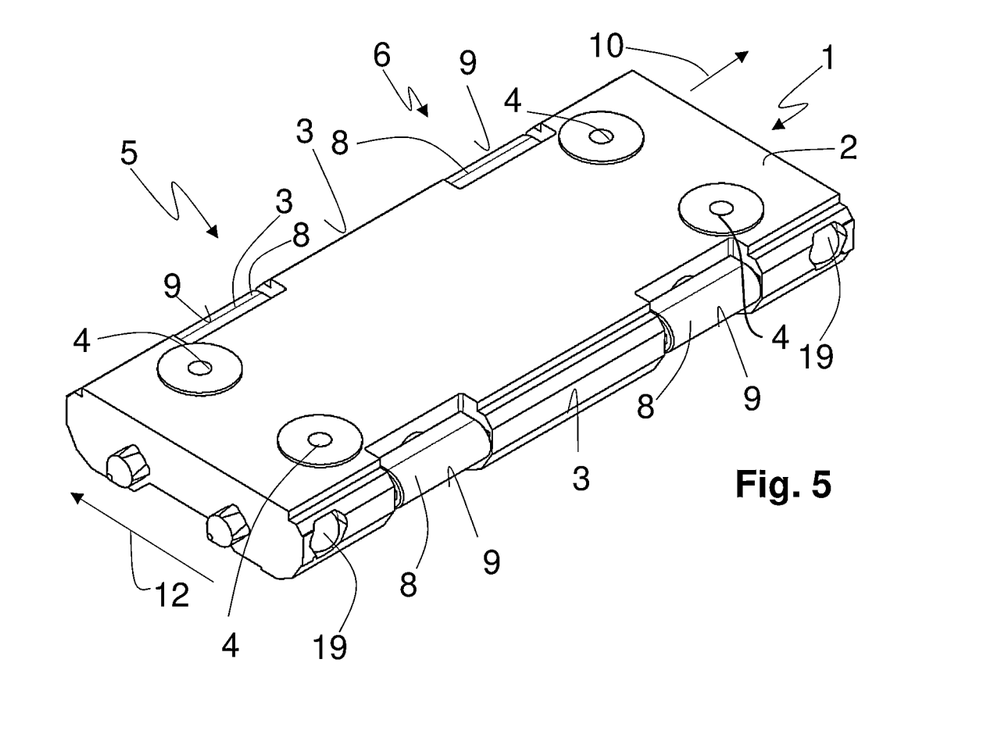
FIG. 5 is an isometric representation of a further embodiment of a carriage according to the invention.
Figure 6:
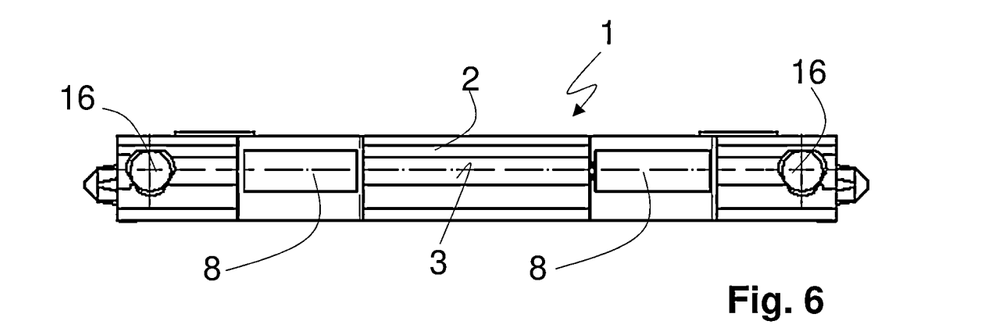
FIG. 6 is a side view of the carriage from FIG. 5.
Figure 7:
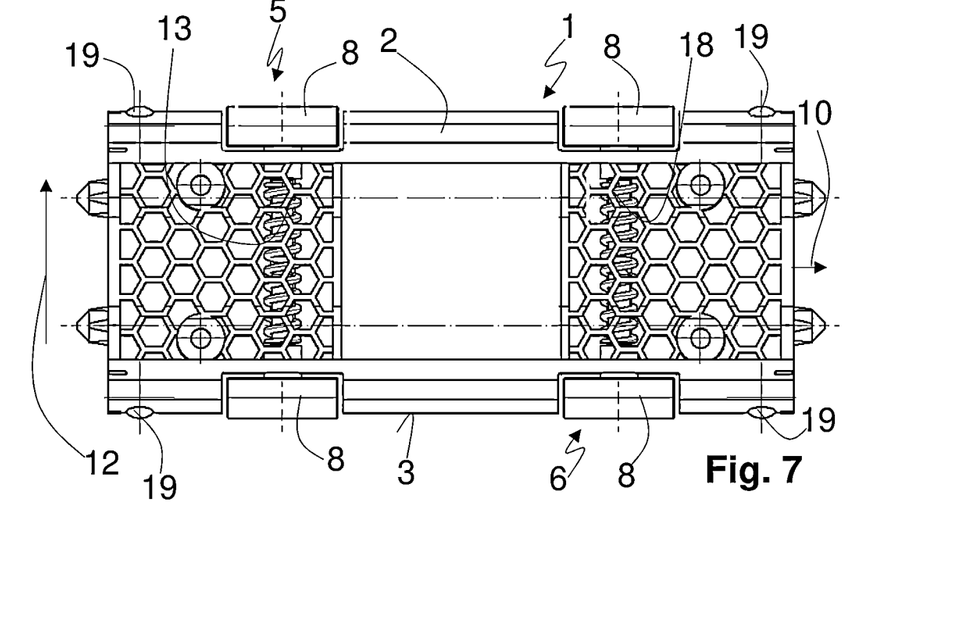
FIG. 7 is a bottom view of the carriage of FIGS. 5 and 6.
Figure 8:
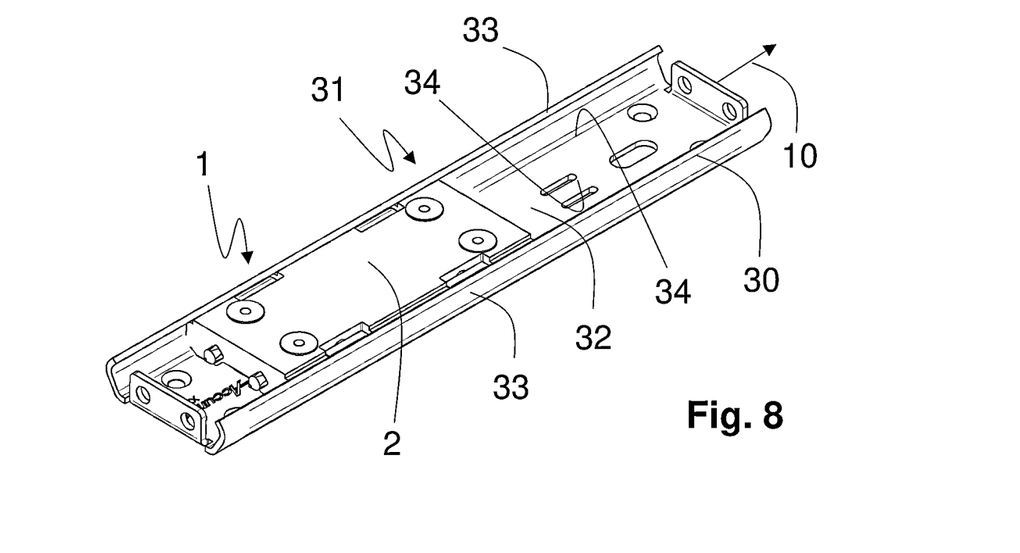
FIG. 8 is an isometric view of a linear guide comprising the carriage of FIGS. 5 to 7 and a rail element.
Figure 9:
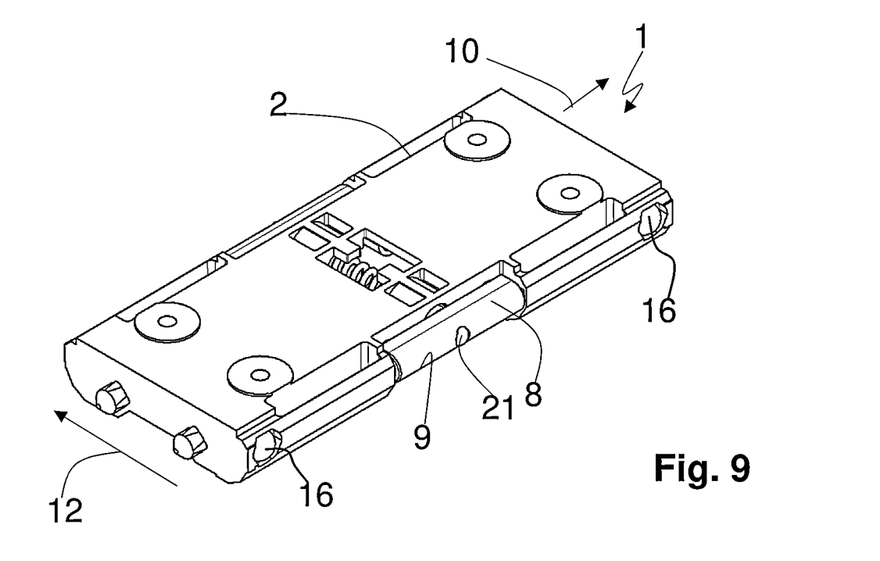
FIG. 9 is an isometric representation of a further embodiment of a carriage according to the invention.
Figure 10:
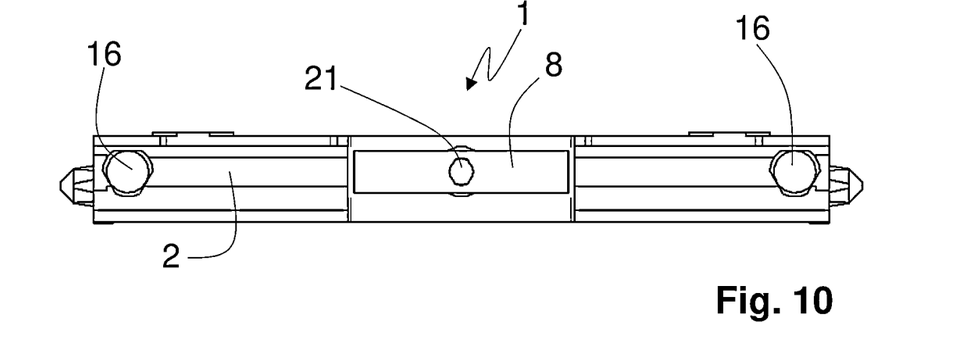
FIG. 10 is a side view of the carriage of FIG. 9.
Figure 11:
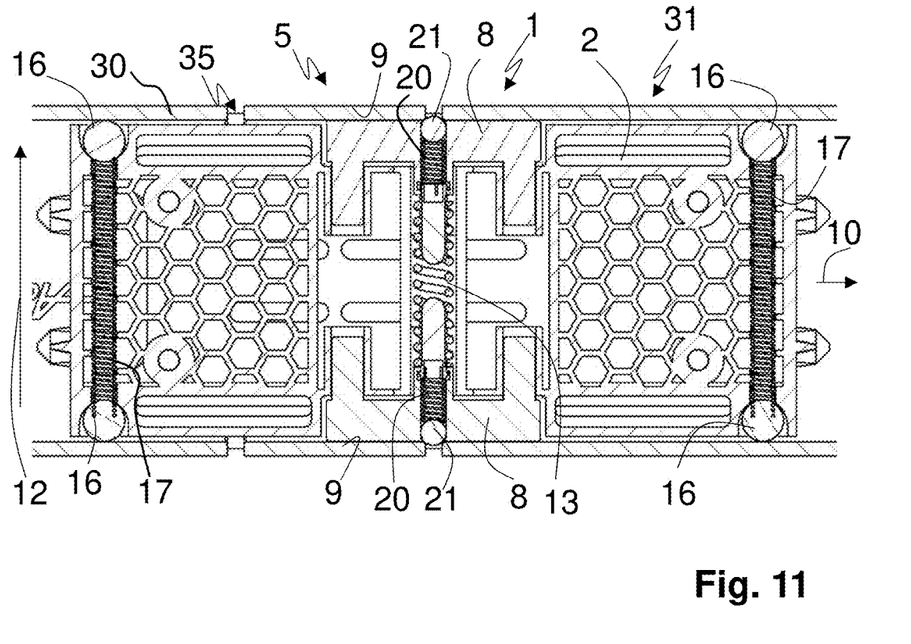
FIG. 11 is a partially broken away cross-sectional view through a linear guide comprising the carriage of FIGS. 9 and 10 and a rail element.
Figure 12:
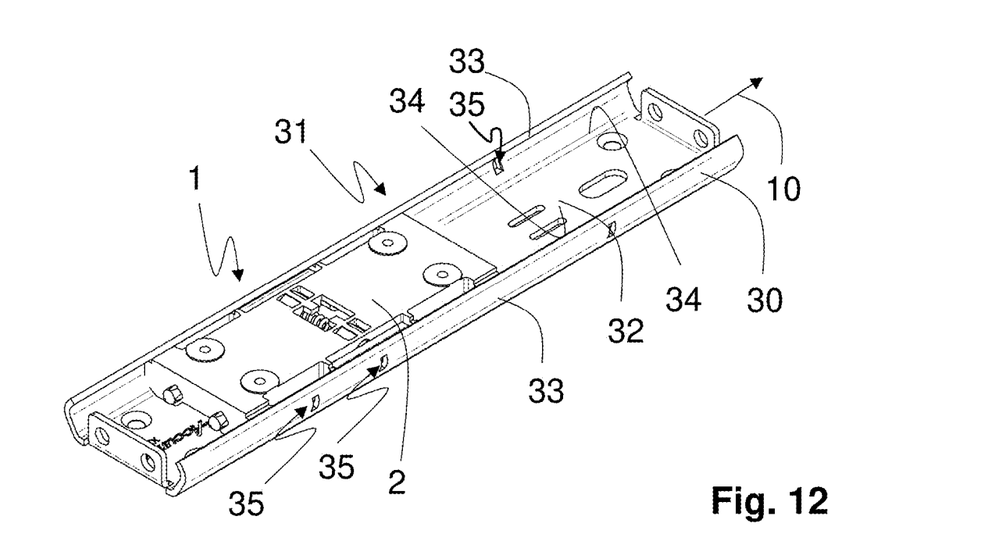
FIG. 12 is an isometric view of the linear guide of FIG. 11.

As can be seen from FIGS. 2 and 3, the sliders 8 are floatingly mounted on the base body 2 in the upward direction 12. That is, the sliders 8 can move freely in the upward direction 12 relative to the base body 2. In doing so, the two sliders 8 are biased away from each other and onto the running surfaces of the rail element by a single spiral spring 13. The spiral spring 13 forms the first support spring element within the meaning of the present application. The spiral spring 13 is also floatingly mounted on the base body 2 and is supported exclusively on corresponding bearing surfaces 14 of the two sliders 8.

While the sliders 8 are mounted so as to be freely movable relative to the base body 2 in the upward direction 12, the mounting in the other directions is such that the sliders 8 form a support. Each of the two sliders 8 has two cylindrical guide pins 15 for this purpose, which are guided in hollow cylindrical guide bushes on the base body 2.

Apart from the guide pins 15, each of the sliders 8 has a basic T-shaped form, wherein the transverse bar of the "T" supports the sliding surface 9, while the vertical part of the "T" engages and guides the coil spring 13.

The two sliders 8 are arranged in the centre of the base body 2 with respect to the pull-out direction 10 and symmetrically on the base body 2.

It has been found that the two sliders 8, which are spring-loaded onto the running surfaces 34 of the rail element 30, do not in all cases provide sufficient stability for guiding the base body 2 of the carriage 1. The carriage 1 has a clearance, especially with larger dimensions, which has a haptic and acoustic effect on a user.

Therefore, a second pair 6 of support elements and a third pair 7 of support elements are provided in the carriage 1 of FIGS. 1 to 4. In the embodiment shown, the support elements of the second and third pairs 6, 7 of support elements are formed by rolling elements in the form of bearing balls 16. The bearing balls 16 are arranged symmetrically in front of and behind the sliders 8 of the first pair 5 of support elements in the pull-out direction 10. The bearing balls 16 are each biased away from each other and towards the running surfaces of the rail element by means of a spiral spring 17 (second and third support spring elements) received on the base body 2. These preloaded bearing balls 16 absorb forces and moments acting on the base body 2 or transfer them via the spiral spring 17.

In the embodiment of FIGS. 1 to 4, the spiral springs 17 of the second and third pairs 6, 7 of support elements are not floatingly laid in the base body 2, but have a high frictional force against the base body 2. Therefore, the base body 2 transmits the forces and moments acting on it to the balls 16 via the respective spiral spring 17. In this way, the balls 16 and their supporting spring elements 17 serve to support the base body 2 in the rail element 30.

The guidance of the bearing balls 16 is designed in such a way that the balls have a defined spring travel in the upward direction 12 when bumping against the spring force of the spiral spring 17. This limitation of the spring travel due to the design of the ball receptacles in the base body 2 prevents excessive pitching and movement of the base body 2 relative to the rail element.

Compared to the embodiment of FIGS. 1 to 4, the support principle of the carriage 1 of FIGS. 5 to 8 is implemented in a modified manner. The carriage 1 of FIGS. 5 to 8 has a first pair 5 of sliders 8 as support elements and a second pair 6 of sliders 8 as further support elements. These two pairs 5, 6 of sliders 8 are mounted on the base body 2 of the carriage 1 at a distance from each other in the pull-out direction 10, wherein the sliders 8 are distributed symmetrically over the base body 2 in the longitudinal direction along the pull-out direction 10. As previously described for the first pair 5 of support elements of the embodiment of FIGS. 1 to 3, the sliders 8 and their respective support spring elements 13, 18 each have a floating mounting in the upward direction 12. The sliders 8 of the two pairs 5, 6 of support elements are all identical in design.

In addition to these two pairs 5, 6 of sliders 8, the base body 2 carries four bearing balls 19 which are not spring-loaded onto the running surfaces to reduce sliding friction in the event of a force or moment being introduced into the carriage 2 which exceeds the spring force of the first and second support spring elements 13, 18.

In addition to improved guidance or mounting of the respective carriage 1 on the rail element, the embodiment of the carriage according to the invention also makes it possible to implement an additional detent function.

In the embodiment of the carriage 1 shown in FIGS. 9 to 12, such a detent function is implemented in that a detent ball 21 pretensioned by means of a detent spring 20 supported on the respective slider 8 of the first pair 5 of support elements is provided on each slider 8. This detent ball 20 engages in one or more detent recesses 35 spaced apart from each other in the pull-out direction 10, which are pressed into the running surfaces 34 of the rail element 30. The detent recesses 35 are clearly visible in the sectional view in FIG. 11 and the isometric view in FIG. 12 of the linear guide 31 of this embodiment. The detent spring 20 is arranged coaxially and concentrically to the spiral spring 13 of the slider 8. This embodiment not only allows the pair of sliders 8 to be mounted centrally, i.e. symmetrically with respect to the pull-out direction 10 on the base body 2, but at the same time also allows the detent ball 21 to be mounted symmetrically with respect to the pull-out direction 10 on the base body 2.

In the embodiments of FIGS. 9 to 12 and 13, the detent ball 21 has a significantly smaller diameter than the bearing balls 19. In this way, the bearing balls 19 roll over the detent recesses 35 provided in the running surfaces 34 of the rail element 30 without the user perceiving this as unduly annoying or a detent. Rather, the detent recesses are adapted to the diameter of the detent ball 21 so that it falls into the detent recesses 35.

Figure 13:
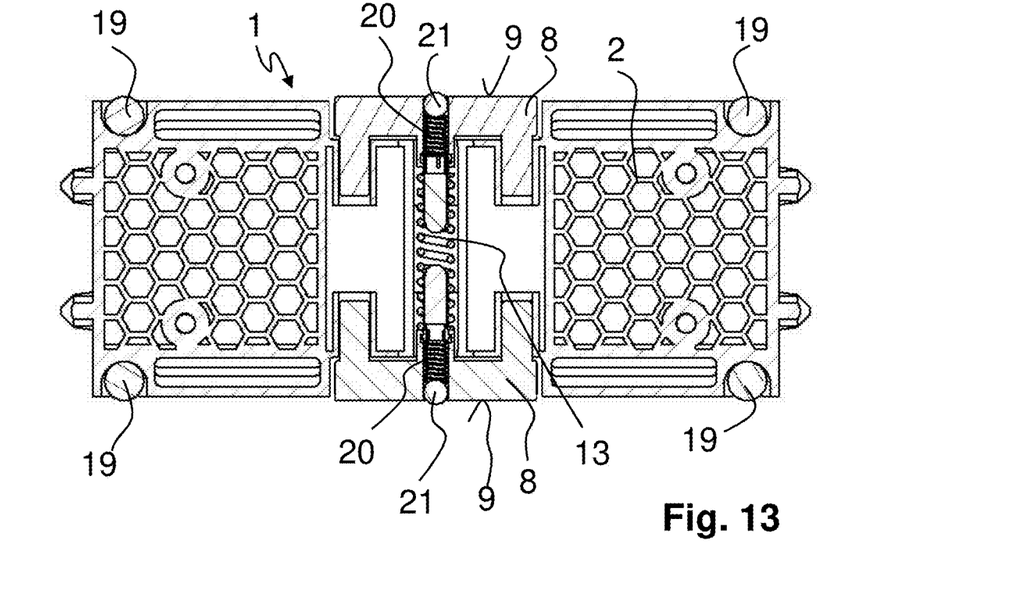
FIG. 13 is a cross-sectional view through another carriage.

FIG. 13 shows an implementation of a detent function by integrating a detent ball 20 into a first pair of sliders 8, wherein, however, the carriage 1 does not require any additional support elements in the form of balls preloaded onto the running surfaces 34 of the rail element 30 (as in the embodiments of FIGS. 1 to 4 and 9 to 12) or in the form of a second pair of sliders 8 (as in the embodiment of FIGS. 5 to 8). The balls 19 shown are not resiliently biased onto the running surfaces 24 as previously described for the embodiment shown in FIGS. 5 to 8. The integration of the detent ball 21 into the slider 8 is the same as shown and described for FIGS. 9 to 12.

Figure 14:
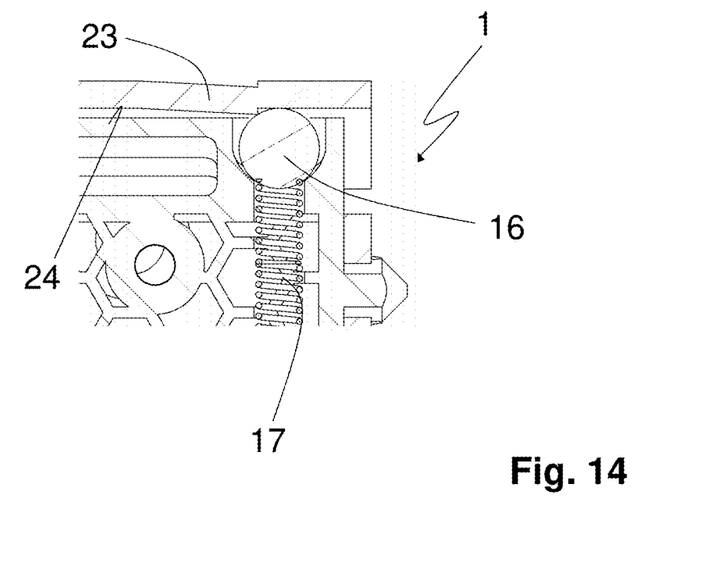
FIG. 14 is an enlarged, partially broken away and partially cut away view of an embodiment of a linear guide according to the invention.

FIG. 14 shows an alternative implementation of a detent function on the carriage 1 of FIGS. 1 to 4. FIG. 14 is an enlarged, partially broken away view of the bearing ball 16 of the third pair 7 of support elements of the embodiment of FIGS. 1 to 4, wherein a corresponding detent projection 23 is embossed on the running surface 24 of the rail element 22. A detent function can also be provided in this way.

Figure 15:
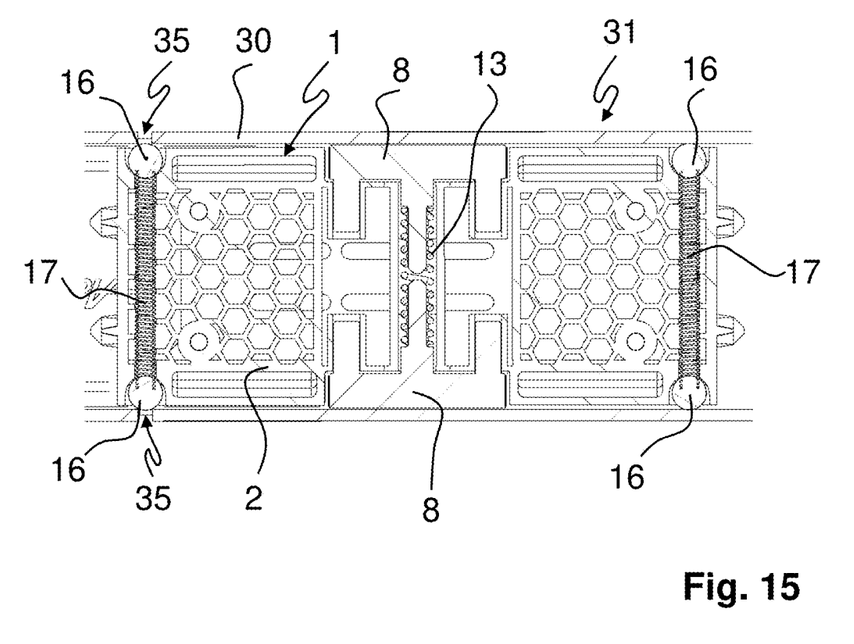
FIG. 15 is a partially broken away cross-sectional view through a linear guide comprising the carriage of FIGS. 1 to 3 and an alternative rail element.

FIG. 15 shows the carriage 1 of FIGS. 1 to 4 in a linear guide 31 with a rail element 30, which has openings as detent recesses 35 in the legs 33 and thus in the running surfaces 34. The detent recesses 35 are designed in such a way that the bearing balls 16 of the second and third pair of support elements 6, 7 can engage in these detent recesses 35, as shown in FIG. 15. In such an embodiment of a linear guide, the preload of the bearing balls 16 of the second and third pair of support elements 6, 7 is also used to provide the detent function.

For purposes of the original disclosure, it is pointed out that all features as they become apparent to a person skilled in the art from the present description, the drawings and the claims, even if they have been specifically described only in combination with certain further features, can be combined both individually and in any combinations with other of the features or groups of features disclosed herein, insofar as this has not been expressly excluded or technical circumstances render such combinations impossible or pointless. A comprehensive, explicit description of all conceivable combinations of features is omitted here only for the sake of brevity and readability of the description.

While the invention has been illustrated and described in detail in the drawings and the foregoing description, this illustration and description is by way of example only and is not intended to limit the scope of protection as defined by the claims. The invention is not limited to the disclosed embodiments.

Variations of the disclosed embodiments will be obvious to those skilled in the art from the drawings, the description and the appended claims. In the claims, the word "comprising" does not exclude other elements or steps, and the indefinite article "a" or "an" does not exclude a plurality. The mere fact that certain features are claimed in different claims does not exclude their combination. Reference signs in the claims are not intended to limit the scope of protection.

LIST OF REFERENCE SIGNS 1 carriage
2 base body
3 guide surface
4 internal thread
5 first pair of support elements
6 second pair of support elements
7 third pair of support elements
8 slider
9 sliding surface
10 pull-out direction
11 surface of the base body
12 upward direction
13 spiral spring (first support spring element)
14 bearing surface
15 guide pin
16 bearing ball
17 spiral spring (second and third support spring element)
18 spiral spring (second support spring element)
19 bearing balls
20 detent spring
21 detent ball
22 rail element
23 detent projection
24 running surface 25 rail element
31 linear guide
32 rail back
33 leg
34 running surface
35 detent recess

The invention claimed is:

1. A carriage for a linear guide system comprising a rail element with two running surfaces facing each other and the carriage movable relative to the rail element in and against a pull-out direction, wherein the carriage comprises
  a base body,
  a first pair of support elements in the form of sliders, and
  at least one first support spring element,
    wherein each of the sliders of the first pair of support elements due to is geometric design or its fixing to the base body, can only slide on the running surfaces but cannot roll,
    wherein each of the sliders of the first pair of support elements is movably mounted on the base body in an upward direction perpendicular to the pull-out direction, so that each of the sliders is frictionally engageable with a respective one of the running surfaces, and
    wherein the at least one first support spring element is mounted on the base body such that the at least one first support spring element biases the sliders of the first pair of support elements away from each other in the upward direction,
  wherein the carriage additionally comprises
  a second pair of support elements and
  at least one second support spring element,
    wherein the second pair of support elements is spaced apart from the first pair of support elements in the pull-out direction,
    wherein each of the support elements of the second pair of support elements is movably supported on the base body in the upward direction so that each of the support elements is engageable with a respective one of the running surfaces, and
    wherein the at least one second support spring element is mounted on the base body such that the at least one second support spring element biases the support elements of the second pair of support elements away from each other in the upward direction.

2. The carriage according to claim 1, wherein the carriage further comprises
  a third pair of support elements and
  at least one third support spring element,
    wherein the support elements of the second pair of support elements are arranged in front of the sliders of the first pair of support elements in the pull-out direction,
    wherein the support elements of the third pair of support elements are arranged behind the sliders of the first pair of support elements in the pull-out direction,
    wherein each of the support elements of the third pair of support elements is movably supported on the base body in the upward direction so that each of the support elements is engageable with a respective one of the running surfaces, and
    wherein the at least one third support spring element is mounted on the base body such that the at least one third support spring element biases the support elements of the third pair of support elements away from each other in the upward direction.

3. The carriage according to claim 2, wherein at least the support elements of the second pair of support elements or of the third pair of support elements are rolling elements, or wherein at least the support elements of the second pair of support elements or of the third pair of support elements are sliders, wherein the sliders of the first pair of support elements comprise a first extension in the pull-out direction, the sliders of the second pair of support elements comprise a second extension in the pull-out direction and the sliders of the third pair of support elements comprise a third extension in the pull-out direction, wherein the second extension and the third extension are smaller than the first extension.

4. The carriage according to claim 2, wherein the support elements of the second and of the third pair of support elements have the same distance in the extension direction from the sliders of the first pair of support elements.

5. The carriage according to claim 2, wherein a stop is provided on the base body for each of the support element of the second pair of support elements and of the third pair of support elements, which stop limits a spring travel of the support elements in a direction perpendicular to the pull-out direction and against a spring force of the second and of the third support spring elements.

6. The carriage according to claim 1, wherein the support elements of the second pair of support elements are sliders.

7. A carriage for a linear guide system comprising a rail element with two running surfaces facing each other and the carriage movable relative to the rail element in and against a pull-out direction, wherein the carriage comprises
  a base body,
  a first pair of support elements in the form of sliders, and
  at least one first support spring element,
    wherein each of the sliders of the first pair of support elements is movably mounted on the base body in an upward direction perpendicular to the pull-out direction, so that each of the sliders is frictionally engageable with a respective one of the running surfaces, and
    wherein the at least one first support spring element is mounted on the base body such that the at least one first support spring element biases the sliders of the first pair of support elements away from each other in the upward direction,
  wherein the carriage additionally comprises
  a second pair of support elements and
  at least one second support spring element,
    wherein the second pair of support elements is spaced apart from the first pair of support elements in the pull-out direction,
    wherein each of the support elements of the second pair of support elements is movably supported on the base body in the upward direction so that each of the support elements is engageable with a respective one of the running surfaces,
    wherein the at least one second support spring element is mounted on the base body such that the at least one second support spring element biases the support elements of the second pair of support elements away from each other in the upward direction,
    wherein the support elements of the second pair of support elements are sliders, and
    wherein each of the sliders of at least one of the first pair of support elements and the second pair of support elements comprises a T-shaped portion, wherein a transverse beam of the T-shaped portion is frictionally engageable with a running surface of the rail element and a vertical beam receives the at least one first or second support spring element.

8. The carriage according to claim 6, wherein each of the sliders of at least the first pair of support elements or the second pair of support elements comprises at least one, preferably cylindrical, guide pin, wherein the guide pin engages in a respective guide bush in the base body, so that each of the sliders is guided in the pull-out direction while it is floating in the upward direction.

9. The carriage according to claim 6, wherein the carriage comprises a plurality of rolling elements,
wherein the plurality of rolling elements is accommodated on the base body in such a way that the plurality of rolling elements can roll at least on the two running surfaces or perform a sliding movement relative to the two running surfaces, and in such a way that the plurality of rolling elements is spaced apart in the pull-out direction from the first and the second pair (5, 6) of support elements, and
wherein the base body defines a position of each of the plurality of rolling elements in the pull-out direction relative to the base body.

10. The carriage according to claim 1, wherein a detent body and a detent spring are additionally provided on the base body, wherein the detent spring biases the detent body in a direction perpendicular to the pull-out direction and in the upward direction or perpendicular to the upward direction.

11. The carriage according to claim 10, wherein the detent spring is supported on a slider of the first pair of support elements.

12. The carriage according to claim 1, wherein the carriage comprises at least exactly one first support spring element or exactly one second support spring element or exactly one third support spring element.

13. The carriage according to claim 12, wherein at least the first support spring element or the second support spring element or the third support spring element is mounted in a floating manner on the base body in the upward direction.

14. The carriage according to claim 2, wherein at least the first support spring element or the second support spring element or the third support spring element is a spiral spring.

15. A linear guide system comprising
a rail element, which rail element comprises two running surfaces facing each other, and
the carriage according to claim 1,
wherein the carriage and the rail element are linearly displaceable relative to each other in and against the pull-out direction,
wherein each of the sliders of the first pair of support elements is frictionally engaged with a respective one of the running surfaces, and
wherein each of the support elements of the second pair of support elements is engaged with a respective one of the running surfaces.

16. A carriage for a linear guide system comprising a rail element with two running surfaces facing each other and the carriage movable relative to the rail element in and against a pull-out direction, wherein the carriage comprises
a base body,
a first pair of support elements in the form of sliders, and
at least one first support spring element,
wherein each of the sliders of the first pair of support elements due to is geometric design or its fixing to the base body, can only slide on the running surfaces but cannot roll,
wherein each of the sliders of the first pair of support elements is movably mounted on the base body in an upward direction perpendicular to the pull-out direction, so that each of the sliders is frictionally engageable with a respective one of the running surfaces, and
wherein the at least one first support spring element is mounted on the base body such that the at least one first support spring element biases the sliders of the first pair of support elements away from each other in the upward direction,
wherein the carriage additionally comprises
a second pair of support elements and
at least one second support spring element,
wherein the second pair of support elements is spaced apart from the first pair of support elements in the pull-out direction,
wherein each of the support elements of the second pair of support elements is movably supported on the base body in the upward direction so that each of the support elements is engageable with a respective one of the running surfaces, and
wherein the at least one second support spring element is mounted on the base body such that the at least one second support spring element biases the support elements of the second pair of support elements away from each other in the upward direction,
wherein the carriage further comprises
a third pair of support elements and
at least one third support spring element,
wherein the support elements of the second pair of support elements are arranged in front of the sliders of the first pair of support elements in the pull-out direction,
wherein the support elements of the third pair of support elements are arranged behind the sliders of the first pair of support elements in the pull-out direction,
wherein each of the support elements of the third pair of support elements is movably supported on the base body in the upward direction so that each of the support elements is engageable with a respective one of the running surfaces,
wherein the at least one third support spring element is mounted on the base body such that the at least one third support spring element biases the support elements of the third pair of support elements away from each other in the upward direction, and
wherein the support elements of the second par of support elements and of the third pair of support elements are rolling elements.

17. A carriage for a linear guide system comprising a rail element with two running surfaces facing each other and the carriage movable relative to the rail element in and against a pull-out direction, wherein the carriage comprises
a base body,
a first pair of support elements in the form of sliders, and
at least one first support spring element,
wherein each of the sliders of the first pair of support elements due to is geometric design or its fixing to the base body, can only slide on the running surfaces but cannot roll,
wherein each of the sliders of the first pair of support elements is movably mounted on the base body in an upward direction perpendicular to the pull-out direction, so that each of the sliders is frictionally engageable with a respective one of the running surfaces, and
wherein the at least one first support spring element is mounted on the base body such that the at least one first support spring element biases the sliders of the first pair of support elements away from each other in the upward direction, wherein the carriage additionally comprises
a second pair of support elements and
at least one second support spring element,
wherein the second pair of support elements is spaced apart from the first pair of support elements in the pull-out direction,
wherein each of the support elements of the second pair of support elements is movably supported on the base body in the upward direction so that each of the support elements is engageable with a respective one of the running surfaces,
wherein the at least one second support spring element is mounted on the base body such that the at least one second support spring element biases the support elements of the second pair of support elements away from each other in the upward direction,
wherein the support elements of the second pair of support elements are sliders, and
wherein each of the sliders of the second pair of support elements due to its geometric design or its fixing to the base body, can only slide on the running surfaces but cannot roll.

\* \* \* \* \*